(12) United States Patent
Takeshima et al.

(10) Patent No.: US 7,306,069 B2
(45) Date of Patent: Dec. 11, 2007

(54) FRAME STRUCTURE IN SADDLE TYPE VEHICLE AND METHOD OF MANUFACTURING FRAME

(75) Inventors: Masao Takeshima, Saitama (JP); Shigeto Inami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 393 days.

(21) Appl. No.: 10/815,754

(22) Filed: Apr. 2, 2004

(65) Prior Publication Data
US 2004/0195035 A1   Oct. 7, 2004

(30) Foreign Application Priority Data

Apr. 4, 2003   (JP)   ............................. 2003-102127
Mar. 8, 2004   (JP)   ............................. 2004-064195

(51) Int. Cl.
B62D 21/00   (2006.01)
(52) U.S. Cl. ........................ 180/312; 280/781; 280/785
(58) Field of Classification Search ................ 280/785, 280/781, 124, 109; 180/312
See application file for complete search history.

(56) References Cited

U.S. PATENT DOCUMENTS

| 4,852,678 A | * | 8/1989 | Yamaguchi ................. 180/219 |
| 4,881,756 A | * | 11/1989 | Kumasaka et al. .......... 280/785 |
| 5,401,056 A | * | 3/1995 | Eastman ..................... 280/785 |
| 6,412,856 B1 | * | 7/2002 | Kajikawa et al. ....... 296/203.01 |
| 6,523,634 B1 | * | 2/2003 | Gagnon et al. ............. 180/291 |
| 6,547,027 B1 | * | 4/2003 | Kalhok et al. .............. 180/312 |
| 6,702,058 B2 | * | 3/2004 | Ishii et al. ................... 180/311 |
| 6,799,781 B2 | * | 10/2004 | Rasidescu et al. .......... 280/781 |

FOREIGN PATENT DOCUMENTS

JP   1-168584 A   7/1989

* cited by examiner

Primary Examiner—Paul N. Dickson
Assistant Examiner—Drew J. Brown
(74) Attorney, Agent, or Firm—Birch, Stewart, Kolasch & Birch, LLP

(57) ABSTRACT

A frame structure and a method of manufacturing a body frame that is divided into small assemblies to facilitate the carriage and storage of articles and individuals and the manufacturing efficiency. A body frame is divided into three, namely, a front assembly having a closed loop structure, an engine support system assembly having a closed loop structure and a rear suspension support system assembly having a closed loop structure. The front assembly and the rear suspension support system assembly are connected to the engine support system assembly to form the body frame. The small assemblies have a closed loop structure whereby the rigidity is enhanced, and the shape is also stabilized. Therefore, the accuracy management can be performed.

19 Claims, 9 Drawing Sheets

FRAME STRUCTURE IN SADDLE TYPE VEHICLE AND METHOD OF MANUFACTURING FRAME

BACKGROUND OF THE INVENTION

CROSS-REFERENCE TO RELATED APPLICATIONS

The present application claims priority under 35 USC 119 to Japanese Patent Application Nos. 2003-102127 filed on Apr. 4, 2003 and 2003-064195 filed on Mar. 8, 2004 the entire contents thereof are hereby incorporated by reference.

1. Field of the Invention

The present invention relates to a frame structure in a saddle type vehicle and a method of manufacturing a frame.

2. Description of Background Art

A the frame structure for a saddle type vehicle is available for the purpose of facilitating the carriage and storage of articles and individuals wherein an arrangement is provided in which a body frame is divided into three blocks. More specifically, a main frame supporting an engine, a front frame supporting front wheels and a seat rail supporting a saddle seat, which are coupled with each other to form the body frame. See, for example, Japanese Patent Laid-open No. Hei 1-168584.

As described above, the body frame is divided into three blocks to thereby facilitate the carriage and storage of articles and individuals, and the blocks are assembled as small assemblies, which are assembled to form the body frame, thus providing an advantage in enhancing the manufacturing efficiency. However, the management of accuracy cannot be accomplished unless the whole body is connected. Therefore, it takes a long period of time for inspection after being assembled as a body frame, posing a problem that the manufacturing efficiency cannot be improved satisfactorily.

SUMMARY AND OBJECTS OF THE INVENTION

It is therefore an object of the present invention to provide a frame structure in a saddle type vehicle and a method of manufacturing a frame in which a body frame is divided into small assemblies to facilitate the carriage and storage of articles and individuals. Thus, and the manufacturing efficiency can be enhanced satisfactorily.

For achieving the above-described object, the present invention provides a body frame 22 that is divided into three. More specifically, a front assembly 72 having a closed loop structure, an engine support system assembly or center assembly 73 having a closed loop structure and a rear suspension support system assembly or rear assembly 74 having a closed loop structure. The front assembly and the rear suspension support system assembly are connected to the engine support system assembly to form the body frame.

In the present invention, a steering support portion including a steering upper bracket 38 and a steering bottom plate 46 is provided on the front assembly.

In the present invention, a steering support portion or an upper steering assembly 80 is provided on the engine support system assembly.

In the present invention, the engine support system assembly is constituted such that a pair of left and right engine support system closed loop structures or a center closed loop pipe structures 77L, 77R are connected by an engine support system cross member or a center cross pipe 27, a steering cross pipe 28, a cross pipe 29, a step cross plate 31, a front lower cross pipe 30 and a front lower connecting pipe 32.

In the present invention, the front assembly has a steering support system closed loop structure or a front closed loop structure 76 in front, and a connecting member or steering holder pipes 37L, 37R, front sub-pipes 41L, 41R, and front lower pipes 40L, 40R connected to the engine support system assembly that extend rearwardly from the steering support system closed loop structure.

In the present invention, the rear suspension support system assembly is constituted such that a pair of left and right triangular rear suspension support system closed loop structures or rear closed loop pipe structures 78L, 78R are connected by a rear suspension support system cross member or a rear cross bracket 51 and a shock absorber 70 of a rear suspension 68 is supported on a bracket or rear shock absorber brackets 66L, 66R provided at a boundary corner 65 of the rear suspension support system closed loop structure.

In the present invention, when the rear suspension is fully compressed, the shock absorber is positioned at a position in which an angle of the corner is divided approximately into two equal parts.

In the present invention, a front suspension support portion 90 is provided on the front assembly.

The present invention, a method is provided that includes the steps of separately forming a front assembly 72 having a closed loop structure, an engine support system assembly or center assembly 78 having a closed loop structure, and a rear suspension support system assembly or rear assembly 74 having a closed loop structure; and connecting the front assembly and the rear suspension support system assembly to the engine support system assembly to form a body frame 22.

According to the present invention, the divided front assembly, engine support system assembly and rear suspension support system assembly, respectively, have a closed loop structure. Therefore their rigidity is enhanced and the shape is also stabilized, and the accuracy management can be carried out by the front assembly, the engine support system assembly and the rear suspension support system assembly, respectively. Further, since the front assembly, the engine support system assembly and the rear suspension support system assembly are connected to form a body frame, the inspection time after assembly as the body frame can be shortened. Accordingly, the body frame is divided into small assemblies to facilitate the carriage and storage of articles and individuals, and the manufacturing efficiency can be enhanced satisfactorily to enable a considerable reduction in the cost. In addition, the accuracy of the front assembly, the engine support system assembly and the rear suspension support system assembly are managed. Therefore, the assemblies can be easily assembled.

According to the present invention, the steering support portion is provided on the front assembly having the rigidity enhanced and the shape stabilized. Thus, the accuracy management of the front assembly can be carried out including the steering support portion.

According to the present invention, the steering support portion is provided on the engine support system assembly having the rigidity enhanced and the shape stabilized. Therefore, the accuracy management of the engine support system assembly can be carried out including the steering support portion.

According to the present invention, the engine support system assembly has a pair of left and right engine support system closed loop structures. Therefore, the rigidity is enhanced satisfactorily. Accordingly, as the engine support system assembly, a better accuracy management can be carried out, and the rigidity of the whole body frame can be enhanced.

According to the present invention, the front assembly has a steering support system closed loop structure in front. Therefore, the rigidity of the front of the body frame is enhanced. Accordingly, the rigidity of the whole body frame can be enhanced.

According to the present invention, the rear suspension system assembly has a pair of left and right rear suspension support system closed loop structures. Therefore, the rigidity is enhanced satisfactorily. Accordingly, the rear suspension support system assembly provides a better accuracy management that can be carried out and the rigidity of the whole body frame can be enhanced. Moreover, the shock absorber of the rear suspension is supported on the bracket provided at a corner of the rear suspension support system closed loop structure, and therefore a load through the shock absorber can be received at the corner having the rigidity increased by the provision of the bracket.

According to the present invention, when the rear suspension, in which the load from the shock absorber is fully compressed at a maximum in the rear suspension support system assembly, the shock absorber is positioned at a position in which an angle of the corner is divided into approximately two equal parts whereby the load can be received evenly by members on both sides constituting a corner. Accordingly, the rigidity of the rear assembly supporting the rear suspension can be enhanced singly to obtain sufficient frame rigidity, enabling a light weight for the assembly.

According to the present invention, the front suspension support portion is provided on the front assembly having the rigidity enhanced and the shape stabilized. Therefore, the mounting accuracy of the front suspension can be enhanced.

According to the present invention, the divided front assembly, engine support system assembly and rear suspension support system assembly, respectively, have a closed loop structure. Therefore, their rigidity is enhanced and the shape is also stabilized. Thus, an accurate management of the assembly can be carried out by the front assembly, the engine support system assembly and the rear suspension support system assembly, respectively. Further, since the front assembly, the engine support system assembly and the rear suspension support system assembly are connected to form a body frame the inspection time after assembly as the body frame can be shortened. Accordingly, the body frame is divided into small assemblies to facilitate the carriage and storage of articles and individuals, and the manufacturing efficiency can be enhanced satisfactorily to enable reducing the cost considerably.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A frame structure in a saddle type vehicle and a frame manufacturing method according to a first embodiment of the present invention will be described hereinafter with reference to FIGS. 1 to 8. The term "front, rear, left and right" used in the following description denotes a "front, rear, left and right" in the movement direction at the time of operation of a vehicle.

Figure 1:
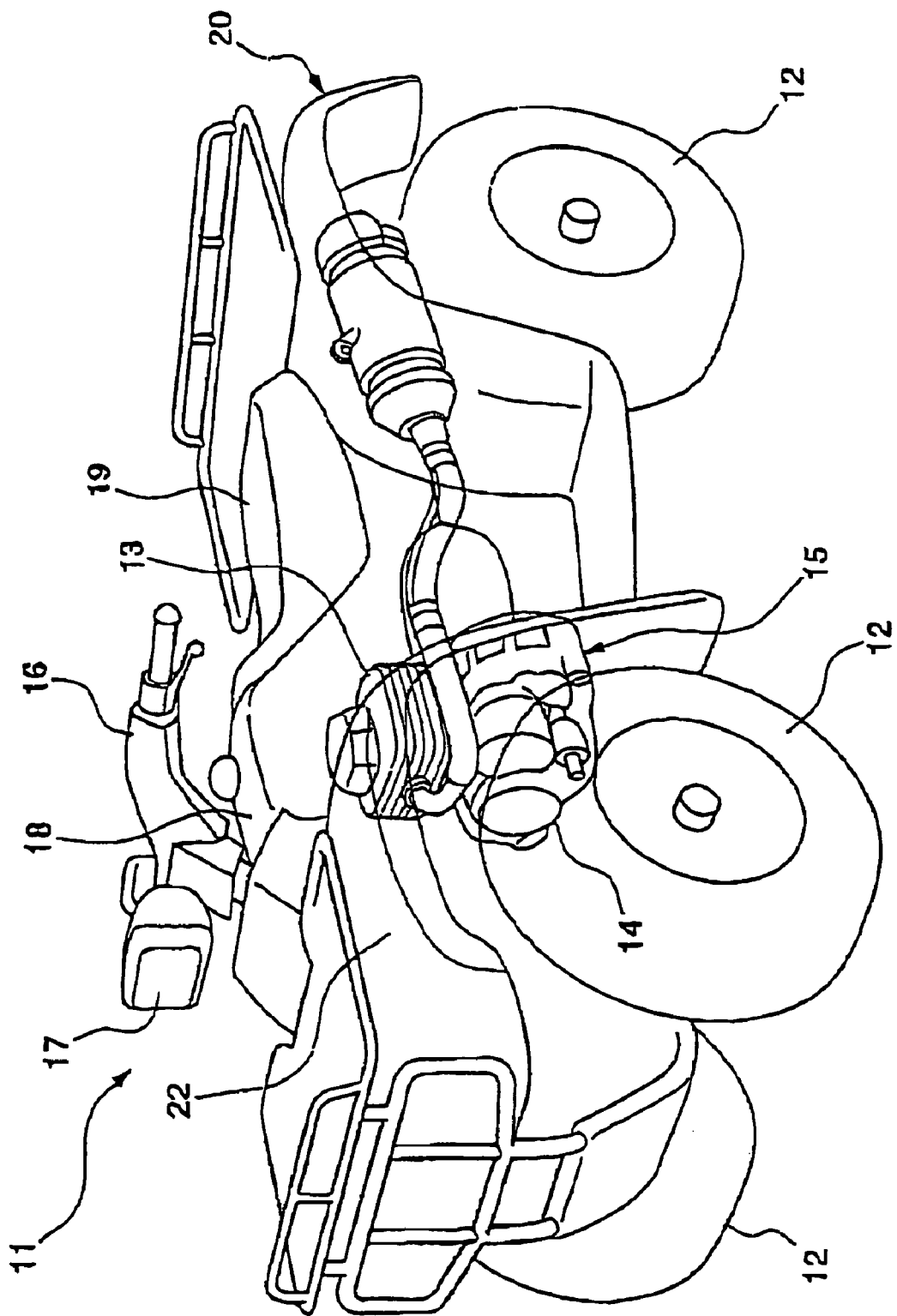
FIG. 1 is a perspective view showing a saddle type vehicle to which a first embodiment of the present invention is applied.

FIG. 1 is a perspective view showing a saddle type vehicle (so-called bogie) for which a main object is to travel on an uneven surface.

The saddle type vehicle 11 has wheels 12 arranged at four corners, at the front, rear, left and right sides of a body, a power unit 15 having an engine 13 and a transmission 14 mounted approximately in a central position of the body. A handle bar 16 is provided so as to extend in a left/right direction on the upper portion at the front side of the body and into which is input steering of a front wheel with a head light unit 17 supported on the handle bar 16. A fuel tank 18 is provided at the rear of the handle bar 16 with a seat 19 provided at the rear of the fuel tank 18 and a body cover 20 made of resin. The saddle type vehicle 11 is of a so-called longitudinally-placed type in which a crankshaft (not shown) of an engine 13 extends in a longitudinal direction.

Figure 2:
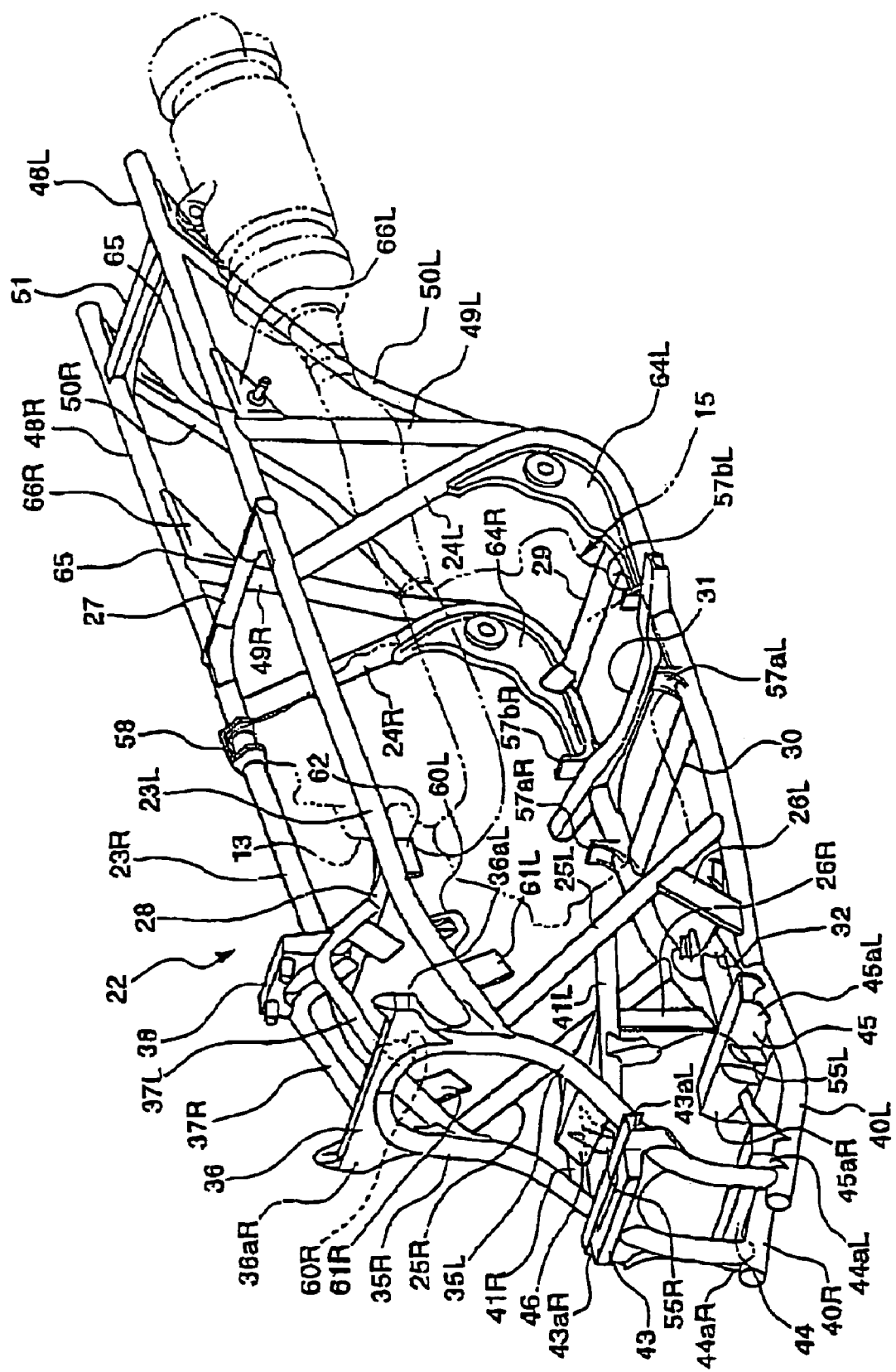
FIG. 2 is a perspective view showing a body frame of a saddle type vehicle according to the first embodiment of the present invention.

A body frame 22 shown in FIG. 2 is provided on the saddle type vehicle 11.

The body frame 22 has, in the central part in the longitudinal direction, a pair of left and right upper pipes 23L, 23R along the longitudinal direction in the upper portion, a pair of left and right lower pipes 24L, 24R connected to the rear portions of the upper pipes 23L, 23R and extending downwardly, curved in the lower portion and extending forwardly and a pair of left and right front tension pipes 25L, 25R for connecting front portions of the upper pipes 23L, 23R and front portions of the lower pipes 24L, 24R. Tension pipe brackets 26L, 26R are provided for connecting front portions of the lower pipes 24L, 24R and the front tension pipes 25L, 25R.

Further, the body frame 22 has, in the central part in the longitudinal direction, a center cross pipe 27 along the left/right direction for connecting rear end portions of the left and right upper pipes 23L, 23R, a steering cross pipe 28 along the left/right direction for connecting front portions of the left and right upper pipes 23L, 23R and a cross pipe 29 for connecting rear portions of the left and right lower pipes 24L, 24R. A front lower cross pipe 30 is provided along the left/right direction for connecting intermediate portions of the left and right lower pipes 24L, 24R. A step cross plate 31 is provided along the left/right direction for connecting the left and right lower pipes 24L, 24R at a position between the cross pipe 29 and the front lower cross pipe 30. A front lower connecting pipe 32 is provided for connecting front portions of the left and right lower pipes 24L, 24R and curved so that the central portion of the pipe 32 is positioned at the front side of the body frame 22.

The body frame 22 has front, left and right front cushion pipes 35L, 35R connected to each other so as to be an approximately U-shape and connected to the front end portions of the upper pipes 23L, 23R in the state where the connected side is arranged on the upper side. A front cushion bracket 36 extending along the left/right direction is connected on the upper side of the front cushion pipes 35L, 35R. Left and right steering holder pipes 37L, 37R are connected to the front cushion bracket 36, extend rearwardly and are connected to the steering cross pipe 28. A steering upper bracket (steering support portion) 38 is provided along the left/right direction for connecting intermediate portions of the left and right steering holder pipes 37L, 37R.

Further, the body frame 22 has front, left and right front lower pipes 40L, 40R connected to the lower end portions of the left and right front cushion pipes 35L, 35R that extend rearwardly and are connected to the front lower connecting pipe 32. Left and right front sub-pipes 41L, 41R are connected to the intermediate portions of the front cushion pipes 35L, 35R and extend rearwardly and are connected to the front tension pipes 26L, 25R.

In addition, the body frame 22 has a front arm upper bracket (front suspension support portion) 43 extending along the left/right direction for connecting the intermediate portions of the left and right front cushion pipes 35L, 35R and a lower arm front bracket (front suspension support portion) 44 extending along the left/right direction for connecting the lower portions of the left and right front cushion pipes 35L, 35R and connecting the front portions of the left and right front lower pipes 40L, 40R. A front lower arm t bracket (front suspension support portion) 45 extends along the left/right direction for connecting the intermediate portions of the left and right front lower pipes 40L, 40R, and a steering bottom plate (steering support portion) 46 extends along the left/right direction for connecting the left and right front sub-pipes 41L, 41R together.

The body frame 22 has, at the rear, left and right rear upper pipes 48L, 48R connected to the center cross pipe 27 and extending rearwardly with left and right rear cushion pipes 49L, 49R connected to the intermediate portions of the rear upper pipes 48L, 48R and extending rearwardly and connected to the curved rear ends of the lower pipes 24L, 24R. Left and right rear sub-pipes 50L, 50R are connected to the rear portions of the rear upper pipes 48L, 48R and extend in the forward direction so as to be inclined downwardly and connected to the lower portions of the rear cushion pipes 49L, 49R. A rear cross bracket 51 extends along the left/right direction for connecting the rear portions of the left and right rear upper pipes 48L, 48R.

In the body frame 22, left and right mounting portions 36aL, 36aR of the front cushion bracket 36 are provided with left and right mounting portions 43aL, 43aR of the front arm upper bracket 43. Left and right upper arm rear brackets (front suspension support portions) 55L, 55R are secured to the left and right front sub-pipes 41L, 41R, left and right mounting portions 44aL, 41aR of the lower arm front bracket 44, and left and right mounting portions 45aL, 45aR of the front lower arm bracket 45 support left and right front suspensions not shown. Here, the front arm upper bracket 43, the lower arm front bracket 44, the front lower arm bracket 45, and the upper arm rear brackets 55L, 55R constitute a front suspension support portion 90.

Further, in the body frame 22, a steering holder not shown is provided on the steering upper bracket 38, and a steering bottom holder not shown is provided on the steering bottom plate 46 for supporting a steering shaft not shown connected to the handle bar 16 shown in FIG. 1.

Further, in the body frame 22, engine hanger brackets 57aL, 57bL, 57aR, 57bR are secured at the front and rear sides of the left and right lower pipes 24L, 24R in the vicinity of the front lower cross pipe 30. A head hanger bracket 58 is secured to the right upper pipe 23R and the like for supporting the power unit 15 including the engine 13. Front fender support brackets 60L, 60R are provided for supporting the body cover 20. Coupler stays 61L, 61R are provided for supporting a coupler not shown or the like that are secured to the upper pipes 23L, 23R. An oil cooler bracket 62 is provided for supporting an oil cooler not shown that is secured to the upper pipe 23L.

In addition, in the body frame 22, left and right rear fork pivot plates 64L, 64R are secured at the inside of each curved portion of the lower pipes 24L, 24R with left and right rear cushion brackets (brackets) 66L, 66R mounted on a boundary corner 65 between the rear upper pipes 48L, 48R. The rear cushion pipes 49L, 49R support a rear suspension 68 shown in FIG. 3.

Figure 3:
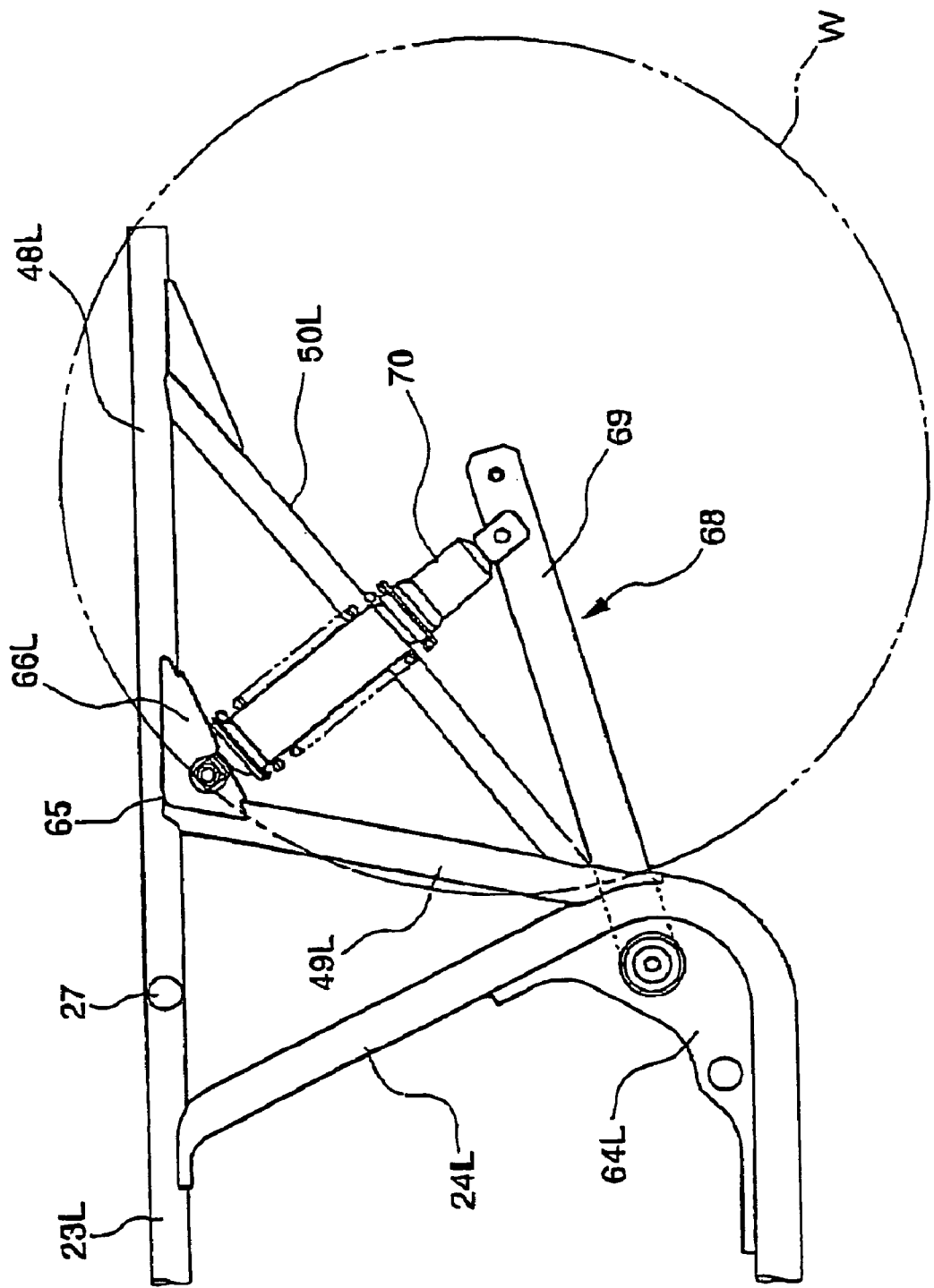
FIG. 3 is a side view of a rear portion showing the state that a rear suspension device is mounted on the body frame of a saddle type vehicle according to the first embodiment of the present invention.

With reference to the left side in FIG. 3, a front end portion of a rear swing arm 69 for supporting a rear wheel W at the rear is supported by the left and right rear fork pivot plates 64L, 64R. The upper portions of left and right shock absorbers 70 by which lower portions are supported on the rear swing arm 69 are supported by left and right rear cushion brackets 66L, 66R. A dimensional relation is set so that when the rear suspension 68 is fully compressed, that is, when the rear swing arm 69 turns in the uppermost direction, (the state shown in FIG. 3), the shock absorber 70 is positioned at a position in which an angle of a boundary corner 65 between the rear upper pipes 48L, 48R and the rear cushion pipes 49L, 49R is divided into approximately two equal parts.

Figure 4:
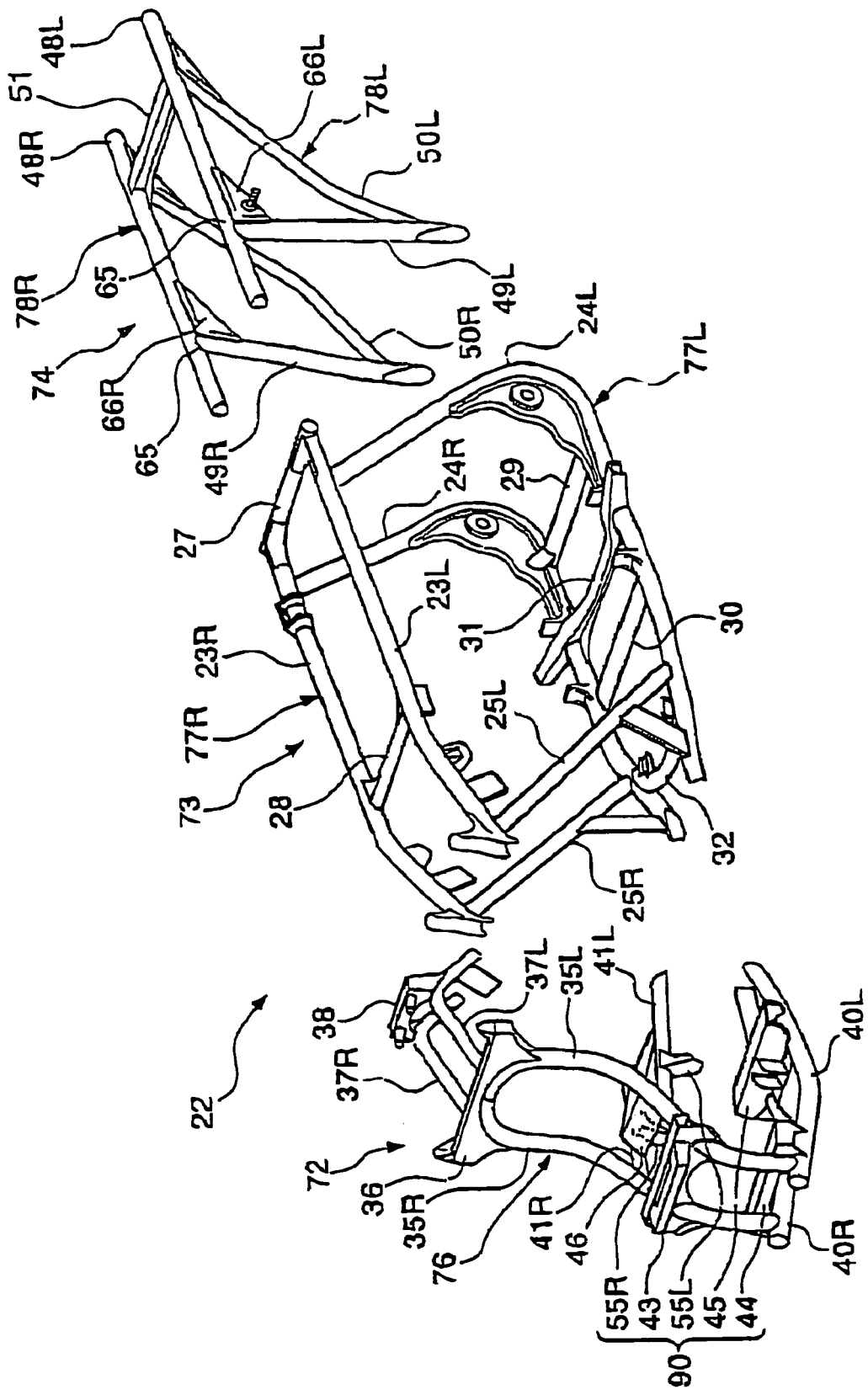
FIG. 4 is an exploded perspective view showing a body frame of the saddle type vehicle according to the first embodiment of the present invention.

In the frame structure according to the first embodiment, the body frame 22 is divided into three, shown in FIG. 4, namely, a front assembly or front suspension support system assembly 72 is provided for supporting a steering shaft not shown that is connected to the handle bar 16 and for supporting a front suspension not shown. A center assembly or an engine support system assembly 73 is provided for supporting the power unit 15 including the engine 13. In addition, a rear assembly 74 or a rear suspension support system assembly is provided for supporting the rear suspension 68. The front assembly 72 and the rear assembly 74 are connected to the center assembly 73 to form the body frame. 72. The front assembly 72, the center assembly 73 and the rear assembly 74 have a closed loop structure which will be described later.

The front assembly 72 is constituted by left and right front cushion pipes 35L, 35R connected to each other into a U-shape with a front arm upper bracket 43 connecting a U-shaped open side and a lower arm front bracket 44. A front closed loop structure or steering support system closed loop structure 76 is provided having a closed loop structure arranged in front of the body frame 22.

The front assembly 72 has a shape such that left and right steering holder pipes or connecting members 37L, 37R are connected from the front closed loop structure 76 to the center assembly 73 with left and right front sub-pipes or connecting members 41L, 41R, and left and right front lower pipes or connecting members 40L, 40R extending rearwardly.

The steering upper bracket 38 is mounted also on the left and right steering holder pipes 37L, 37R so as to constitute a closed loop with the front cushion bracket 36. The steering bottom bracket 46 is mounted also on the left and right front sub-pipes 41L, 41R so as to constitute a closed loop with the front arm upper bracket 43. The front lower arm bracket 45 is mounted also on the left and right front lower pipes 40L, 40R so as to constitute a closed loop with the lower arm front bracket 44.

The center assembly 73 has a center closed loop pipe structure or an engine support system closed loop structure 77L having a closed loop structure constituted by the upper pipe 23L, the lower pipe 24L and the front tension pipe 25L. A center closed loop pipe structure or an engine support system closed loop structure 77R is provided that includes a structure constituted by the upper pipe 23R, the lower pipe 24R and the front tension pipe 25R. That is, the center closed loop pipe structures 77L, 77R are constituted by connecting the pipe members in the form of a closed loop.

The pair of left and right center closed loop pipe structures 77L, 77R are connected by the center cross pipe or engine support system cross member 27, the steering cross pipe or engine support system cross member 28, the cross pipe or engine support system cross member 29, the step cross plate or engine support system cross member 31, the front lower cross pipe or engine support system cross member 30 and the front lower connecting pipe or engine support system cross member 32 to constitute the center assembly 73. A plurality of center cross pipes 27, steering cross pipes 28, cross pipes 29, step cross plates 31, front lower cross pipes 30 and front lower connecting pipes 32 are mounted on the center closed loop pipe structures 77L, 77R, whereby closed loop structure portions are formed in the front, rear, upper and lower places of the center assembly 73.

The rear assembly 74 has a rear closed loop pipe structure or rear suspension support system closed loop structure having a triangular closed loop structure constituted by the rear upper pipe 48L, the rear cushion pipe 49L and the rear sub-pipe 50L. A rear closed loop pipe structure or rear suspension support system closed loop structure 78R is provided with a triangular closed loop structure constituted by the rear upper pipe 48R, the rear cushion pipe 49R and the rear sub-pipe 50R. That is, the rear closed loop pipe structures 78L, 78R are constituted by connecting the pipe members into a closed loop.

The pair of left and right rear closed loop pipe structures 78L, 78R are connected by the rear cross bracket 51 or rear suspension support system cross member to constitute the rear assembly 74.

In the rear assembly 74, the shock absorber 70 of the rear suspension 68 shown in FIG. 3 is supported on the rear cushion brackets 66L, 66R provided internally of the boundary corner 65 opposite to the rear sub-pipes 50L, 50R at the corner formed by the rear upper pipes 48L, 48R of the rear closed loop pipe structures 78L, 78R and the rear cushion pipes 49L, 49R. The boundary corner 65 formed by the rear upper pipes 48L, 48R and the rear cushion pipes 49L, 49R is formed at an obtuse angle.

Next, assembling of the front assembly 72 will be described hereinafter with reference to FIGS. 4 and 5.

Figure 5:
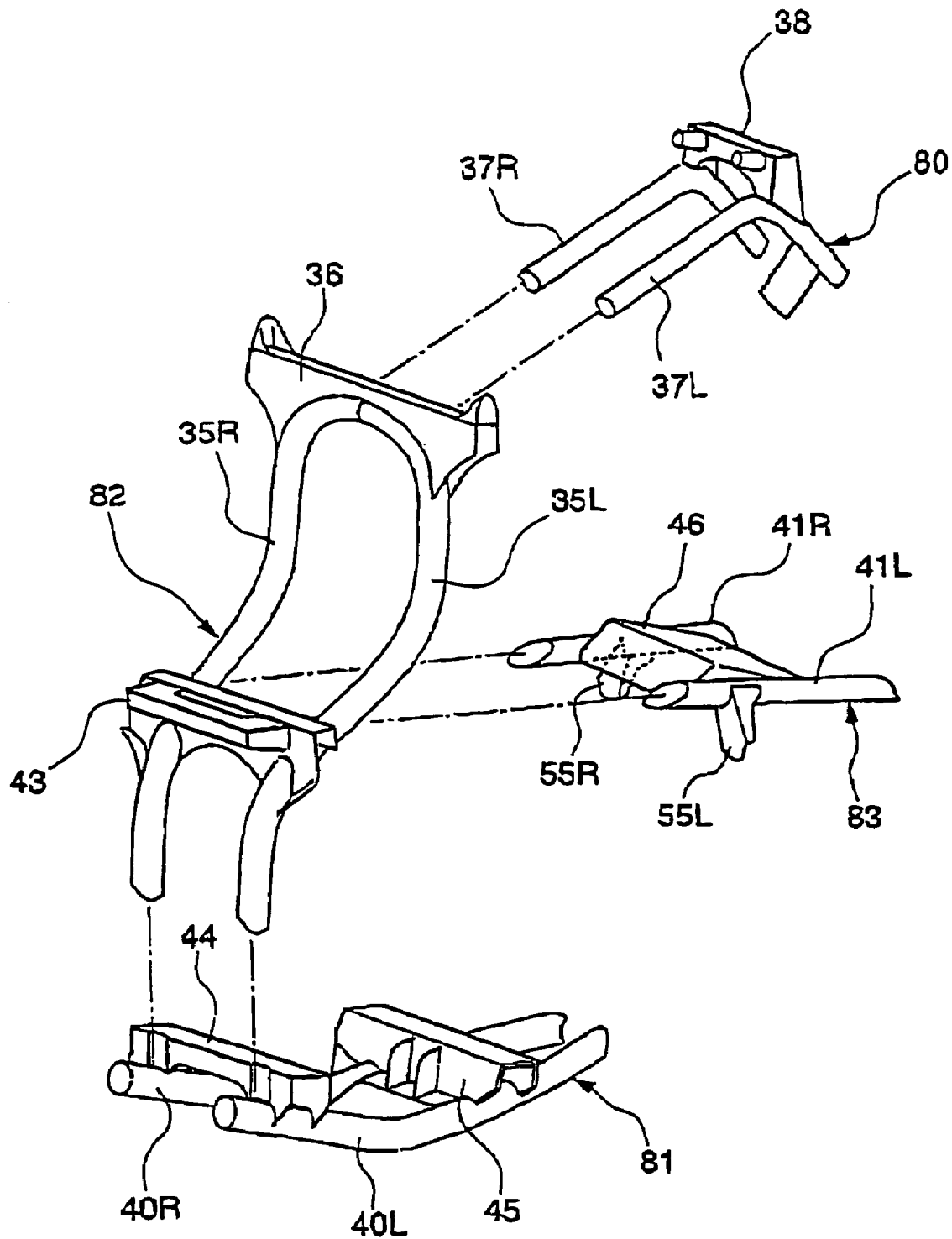
FIG. 5 is an exploded perspective view showing the state before a front assembly in the body frame of the saddle type vehicle according to the first embodiment of the present invention is assembled.

The left and right steering holder pipes 37L, 37R are welded on both left and right sides of the steering upper bracket 38 along the left/right direction to form an upper steering assembly or steering support portion 80 shown in FIG. 5. The upper steering assembly 80 includes the left and right steering holder pipes 37L, 37R connected by the steering upper bracket 38 for supporting the upper side of a steering shaft not shown.

Further, the left and right front cushion pipes 35L, 35R are welded together, and the front arm upper bracket 43 and the front cushion bracket 36 along the left/right direction are welded to form a front cushion assembly 82.

Further, the upper arm rear brackets 55L, 55R are welded to the left and right front sub-pipes 41L, 41R, and the front sub-pipes 41L, 41R are welded on both left and right sides of the steering bottom plate 46 to form a steering assembly 83.

In addition, the left and right front lower pipes 40L, 40R are welded on both left and right sides of the lower arm front bracket 44 and the front lower arm bracket 45 to form a lower arm assembly 81.

As shown by broken lines in FIG. 5, the lower ends of the left and right front cushion pipes 35L, 35R of the front cushion assembly 82 are welded to the lower arm front bracket 44 of the lower arm assembly 81 and the front lower pipes 40L, 40R on both left and right sides, the front ends of the left and right front sub-pipes 41L, 41R of the steering assembly 83 are welded to the left and right front cushion pipes 35L, 35R of the front cushion assembly 82, and the front ends of the steering holder pipes 37L, 37R of the upper steering assembly 80 are welded to the front cushion bracket 36 of the front cushion assembly 82. Thus, the front assembly 72 shown in FIG. 4 is assembled.

Next, assembling of the center assembly 73 will be described hereinafter with reference to FIGS. 4, 6 and 7.

The head hanger bracket 58, the front fender support bracket 60R and the coupler stay 61R are welded to the right upper pipe 23R to form a right upper pipe assembly 86R.

Further, the oil cooler bracket 62, the front fender support bracket 60L and the coupler stay 61L are welded to the left upper pipe 23L to form a left upper pipe assembly 86L.

Further, the right rear fork pivot plate 64R is welded to the inside of the curved portion of the right lower pipe 24R, and the right engine hanger brackets 57aR, 57bR, in this order, are welded on the front side of the rear fork pivot plate 64R of the lower pipe 24R to form a right lower pipe assembly 85R.

Further, the left rear fork pivot plate 64L is welded to the inside of the curved portion of the left lower pipe 24L, and the left engine hanger brackets 57aL, 57bL, in this order, are welded on the front side of the rear fork pivot plate 64L of the lower pipe 24L to form a left lower pipe assembly 85L.

Figure 6:
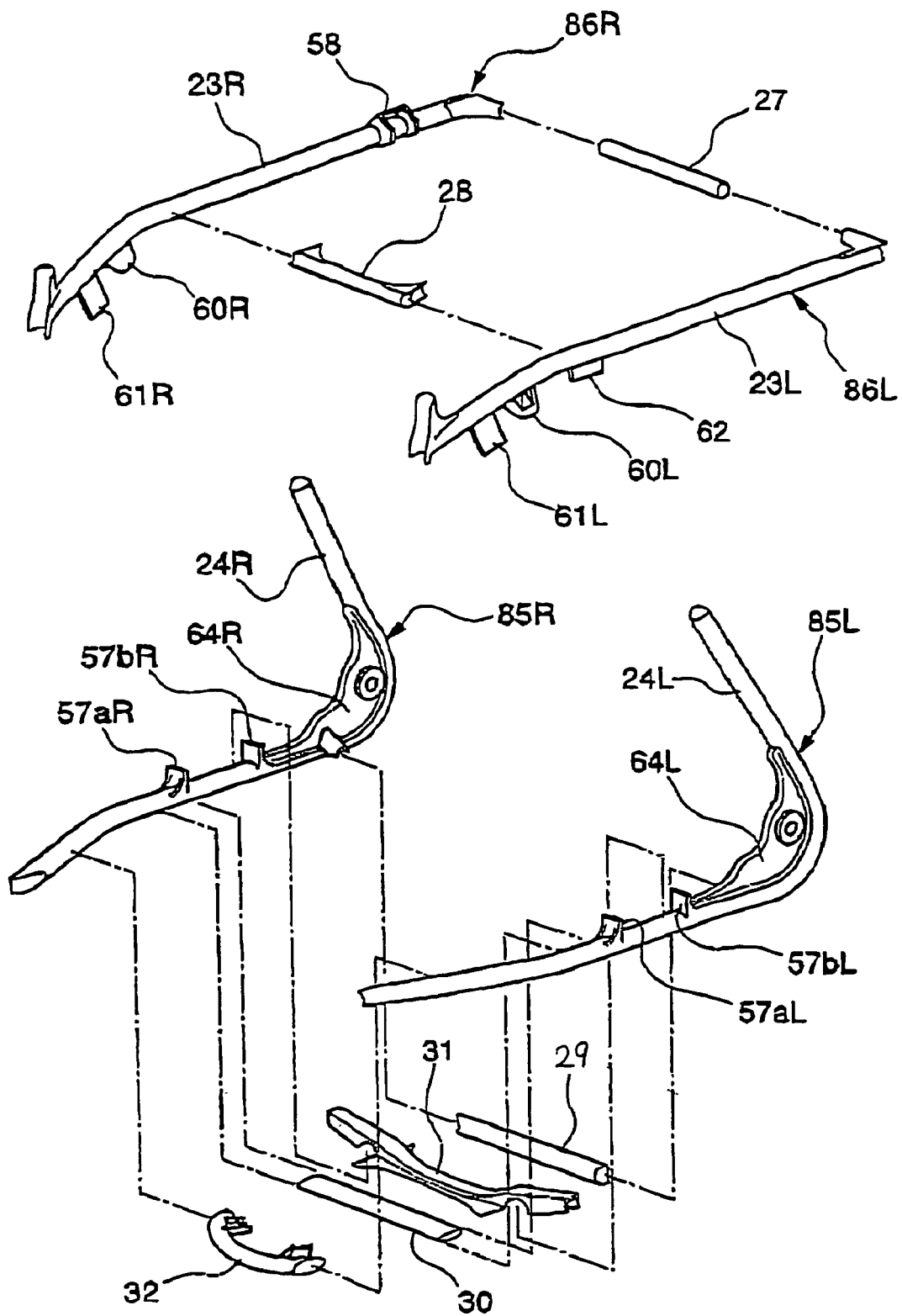
FIG. 6 is an exploded perspective view showing the state before an upper center assembly and a lower center assembly in the body frame of the saddle type vehicle according to the first embodiment of the present invention are assembled.
Figure 7:
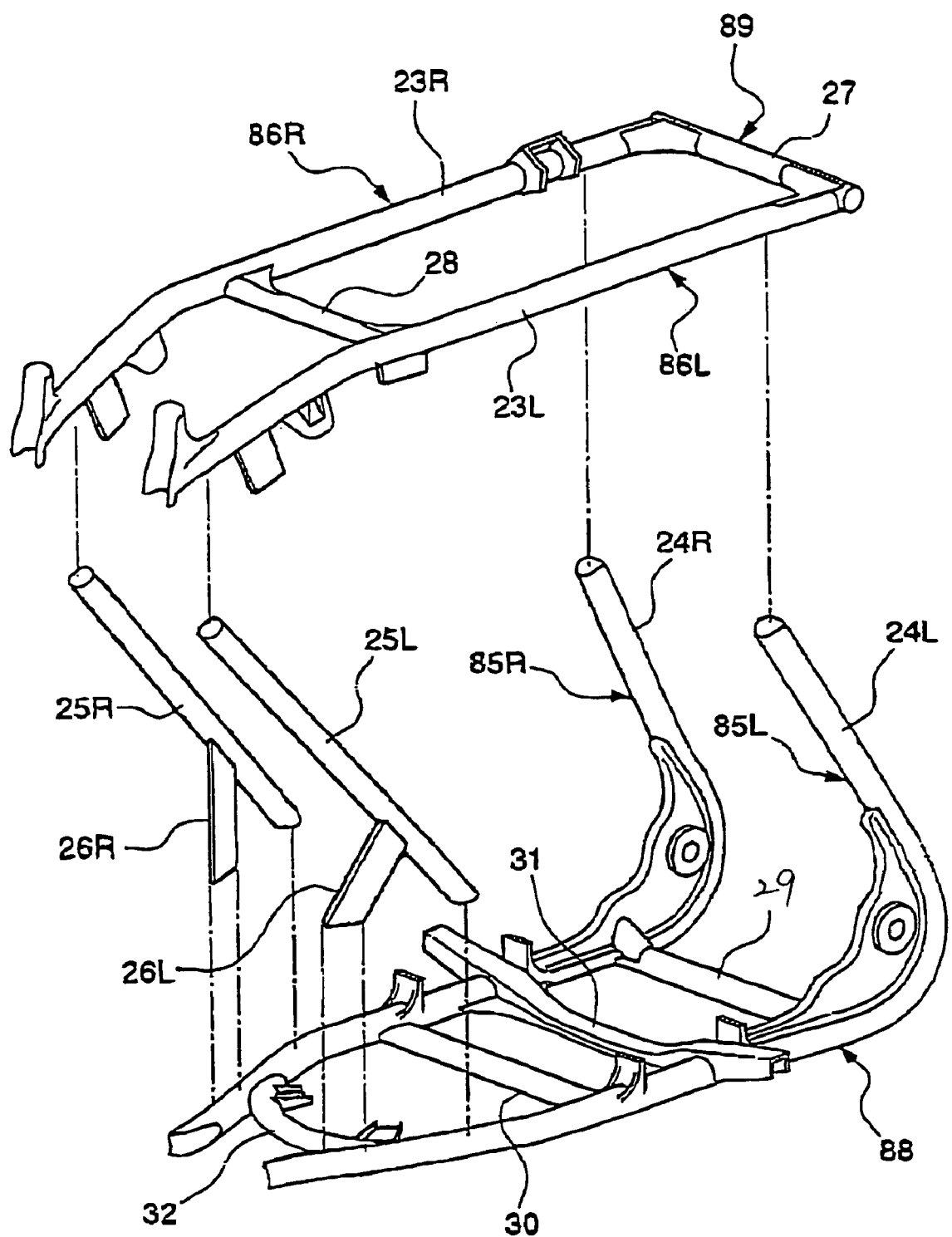
FIG. 7 is an exploded perspective view showing the state before a center assembly in the body frame of the saddle type vehicle according to the first embodiment of the present invention is assembled.

As shown by broken lines in FIG. 6, both left and right sides of the center cross pipe 27 and the steering cross pipe 28 along the left/right direction are welded to the left upper pipe assembly 86L and the right upper pipe assembly 86R to form an upper center assembly 89 shown in FIG. 7.

Further, as shown by broken lines in FIG. 6, both left and right sides of the cross pipe 29, the step cross plate 31, the front lower cross pipe 30 and the front lower connecting pipe 32 along the left/right direction are welded to the left lower pipe assembly 85L and the right lower pipe assembly 85R to form a lower center assembly 88 shown in FIG. 7.

As shown by broken lines in FIG. 7, the rear portions of the left and right upper pipes 23L, 23R of the upper center assembly 89 are welded to the rear upper ends of the left and right lower pipes 24L, 24R of the lower center assembly 88 formed as described above. Both ends of the left and right front tension pipes 25L, 25R are welded to the front portions of the left and right lower pipes 24L, 24R of the lower center assembly 88 and the front ends of the left and right upper pipes 23L, 23R of the upper center assembly 89. The lower ends of the tension pipe brackets 26L, 26R are welded in advance to the left and right front tension pipes 25L, 25R that are welded to the left and right lower pipes 24L, 24R to form a center assembly 73 shown in FIG. 4.

Next, assembling of the rear assembly 74 will be described hereinafter with reference to FIGS. 4 and 8.

Figure 8:
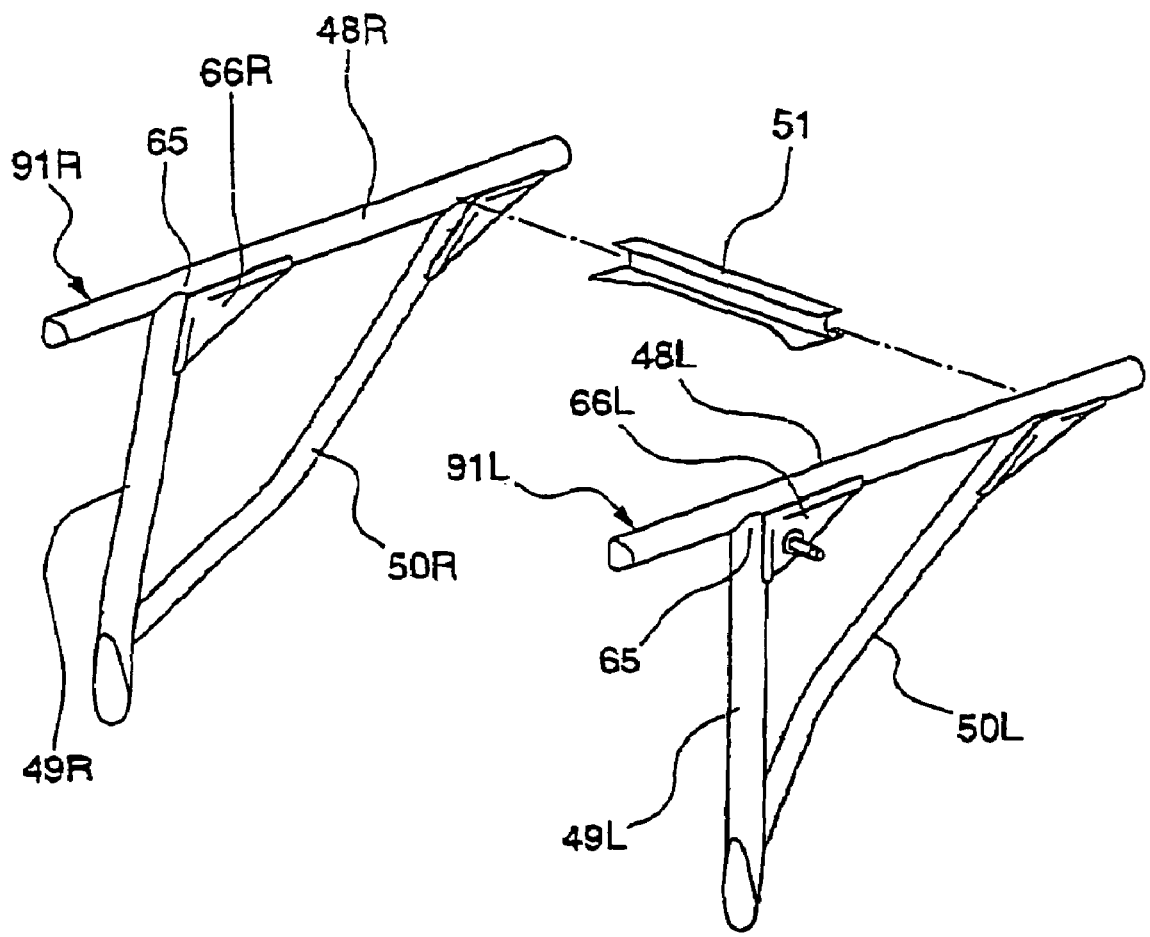
FIG. 8 is an exploded perspective view showing the state before a rear assembly in the body frame of the saddle type vehicle according to the first embodiment of the present invention is assembled.

The upper end of the right rear cushion pipe 49R is welded to the front portion of the right rear upper pipe 48R, both ends of the right rear sub-pipe 50R are welded to the rear portion of the right rear upper pipe 48R and the lower portion of the right rear cushion pipe 49R, and the right rear cushion bracket 66R is welded to the boundary corner 65 between the right rear upper pipe 48R and the right rear cushion pipe 49R to form a right rear assembly 91R shown in FIG. 8.

Further, the upper end of the left rear cushion pipe 49L is welded to the front portion of the left rear upper pipe 48L, both ends of the left rear sub-pipe 50L are welded to the rear portion of the left rear upper pipe 48L and the lower portion of the left rear cushion pipe 49L. Further, the left rear cushion bracket 66L is welded to the boundary corner 65 between the left rear upper pipe 48L and the left rear cushion pipe 49L to form a left rear assembly 91L.

As shown by a broken line in FIG. 8, both ends of the rear cross bracket 51 along the left/right direction are welded to the left rear assembly 91L and the right rear assembly 91R to form the rear assembly 74 shown in FIG. 4.

Finally, in the front assembly 72, the center assembly 73 and the rear assembly 74, the front assembly 72 is connected to the front of the center assembly 73, and the rear assembly 74 is connected to the rear side of the center assembly 73.

The front ends of the left and right upper pipes 23L, 23R of the center assembly 73 are welded to the left and right front cushion pipes 35L, 35R of the front assembly 72. The rear ends of the left and right steering holder pipes 37L, 37R of the front assembly 72 are welded to the steering cross pipe 28 of the center assembly 73 with the rear ends of the left and right front sub-pipes 41L, 41R are welded to the left and right front tension pipes 25L, 25R of the center assembly 73. The rear ends of the left and right front lower pipes 40L, 40R are welded to the front lower connecting pipe 32 of the center assembly 73 and the extreme ends of the lower pipes 24L, 24R of the center assembly 73 are welded to the intermediate portions of the left and right front lower pipes 40L, 40R.

Further, the front ends of the left and right rear upper pipes 48L, 48R of the rear assembly 74 are welded to the center cross pipe 27 of the center assembly 73, and the lower ends of the left and right rear cushion pipes 49L, 49R of the rear assembly 74 are welded to the rear ends on the lower side of the left and right lower pipes 24L, 24R of the center assembly 73. In this manner, the body frame 22 shown in FIG. 2 is formed.

As described above, according to the first embodiment, the divided front assembly 72 has the front closed loop structure 76, the center assembly 73 has the center closed loop pipe structures 77L, 77R, and the rear assembly 74 has the rear closed loop pipe structures 78L, 78R. Whereby their rigidity is enhanced and the shape is also stabilized. Therefore, the accuracy management can be carried out by the front assembly 72, the center assembly 73 and the rear assembly 74. In addition, the front assembly 72, the center assembly 73 and the rear assembly 74 are subjected to the accuracy management and are connected to provide the body frame 22. Thus, it is possible to enable a shortening of the inspection time after being assembled as the body frame 22. Accordingly, the body frame 22 is divided into the front assembly 72, the center assembly 73 and the rear assembly 74 to facilitate carriage and storage. Thus, the number of steps can be standardized, and the loss in the steps is reduced, whereby the manufacturing efficiency can be enhanced satisfactorily and the cost can be reduced considerably.

Further, the upper steering assembly 80 is provided on the front assembly 72 of which the rigidity is enhanced and the shape is stabilized. Therefore, the accuracy management of the front assembly 72 can be carried out including the upper steering assembly 80.

In addition, the accuracy of the front assembly 72, the center assembly 73 and the rear assembly 74 is managed. Therefore, the assembly can be assembled easily. Accordingly, since the least welding will suffice, an increase in weight caused by welding can be minimized, the weight is reduced, and the accuracy as the final body frame 22 can be secured.

Further, the center assembly 73 has the center closed loop pipe structure 77L having the closed loop structure constituted by the upper pipe 23L, the lower pipe 24L and the front tension pipe 25L. The closed loop pipe structure 77R includes the closed loop structure constituted by the upper pipe 23R, the lower pipe 24R and the front tension pipe 25R. Therefore, the rigidity is to be enhanced satisfactorily. Accordingly, accuracy management of the center assembly 73 can be carried out and the rigidity of the whole body frame 22 can be enhanced. Moreover, the pair of left and right center closed loop pipe structures 77L, 77R are connected and constituted by a plurality of center cross pipes 27, steering cross pipes 28, cross pipes 29, steering cross plates 31, front lower cross pipes 30 and front lower connecting pipes 32. Therefore the rigidity is to be further enhanced. Accordingly, the accuracy management as the center assembly 73 can be carried out and the rigidity of the whole body frame 22 can be enhanced.

Further, the front assembly 72 including many welded parts has the front closed loop structure 76 having the closed loop structure including the left and right front cushion pipes 35L, 35R to form a U-shape by connecting each end of the pipes 35L, 35R. The front arm upper bracket 43 is provided for connecting the other ends of the pipes 35L, 35R and the lower arm front bracket 44 and arranged on the front surface of the body frame 22. Therefore, the rigidity of the front surface of the body frame 22 is enhanced. Accordingly, the rigidity of the whole body frame 22 can be enhanced and the steering can be assembled with good accuracy.

In addition, the rear assembly 74 has a rear closed loop pipe structure 78L having the triangular closed loop structure constituted by the rear upper pipe 48L, the rear cushion pipe 49L and the rear sub-pipe 50L. The rear closed loop pipe structure 78R includes the triangular closed loop structure constituted by the rear upper pipe 48R, the rear cushion pipe 49R and the rear sub-pipe 50R. Therefore, the rigidity is satisfactorily enhanced. Accordingly, the accuracy management as the rear assembly 74 can be carried out well, and the rigidity of the whole body frame 22 can be enhanced. Moreover, the shock absorber 70 of the rear suspension 68 is supported on the rear cushion brackets 66L, 66R provided at the boundary corner 65 of the rear closed loop pipe structures 78L, 78R. Therefore, the load can be received, through the shock absorber 70, by the boundary corner 65 having the rigidity enhanced by the provision of the rear cushion brackets 66L, 66R.

Further, in the rear assembly 74, when the rear suspension 68 is fully compressed in which the load from the shock absorber 70 is maximum, the shock absorber 70 is positioned at a position in which the angle of the boundary corner 65 is divided into approximately two equal parts, whereby the load can be evenly received by both rear upper pipes 48L, 48R and the rear cushion pipes 49L, 49R constituting the boundary corner 65. Accordingly, the rigidity of the rear assembly 74 supporting the rear suspension 68 can be enhanced singly to obtain the sufficient frame rigidity, enabling reducing the weight.

In addition, the front arm upper bracket 43 for supporting the front suspension, the lower arm front bracket 44, the front lower arm bracket 45, and the upper arm rear brackets 55L, 55R are provided on the front assembly 72 having the rigidity enhanced and the shape stabilized. Therefore, the mounting accuracy of the front suspension can be enhanced.

Figure 9:
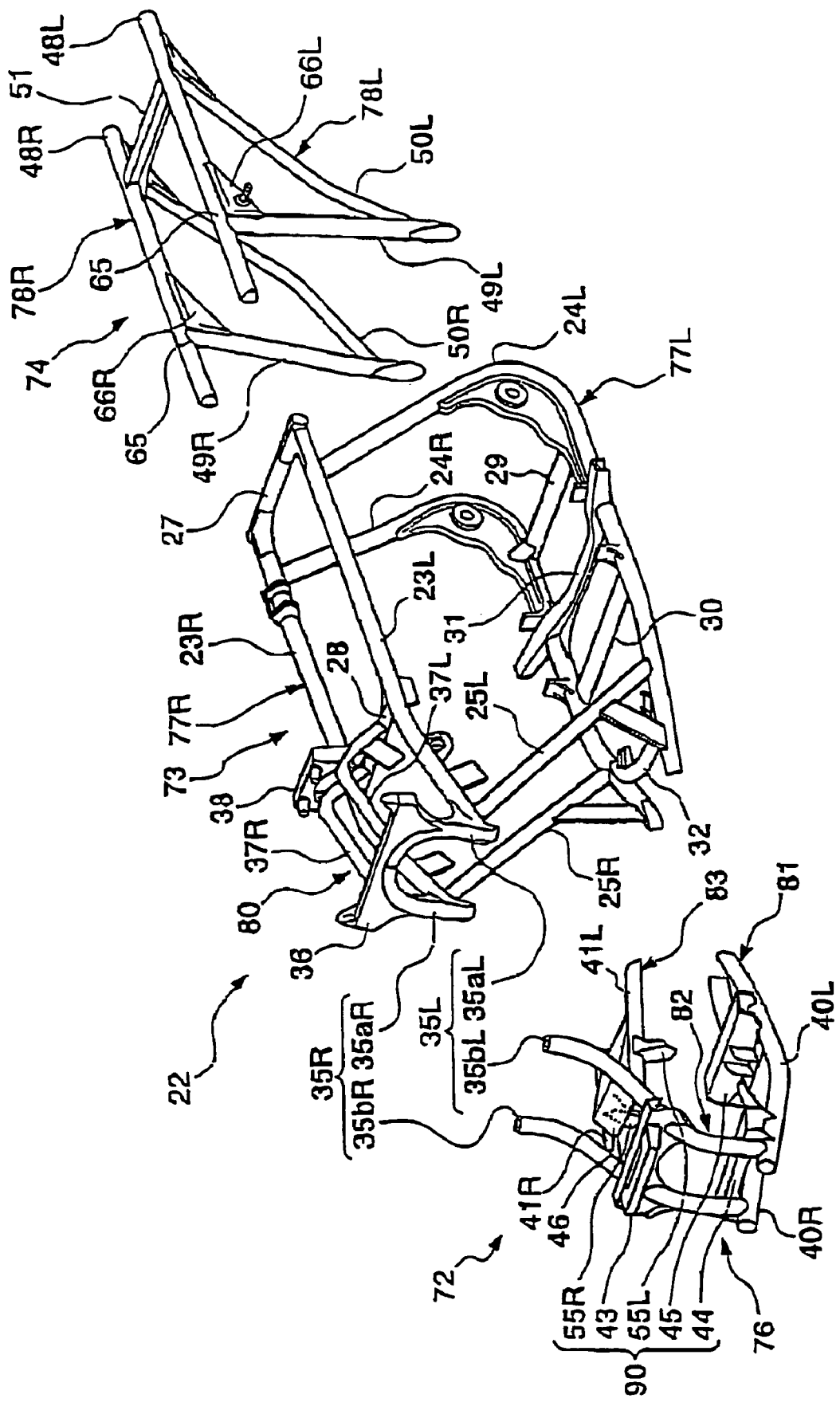
FIG. 9 is an exploded perspective view showing a body frame of a saddle type vehicle according to a second embodiment of the present invention.

Next, a frame structure in a saddle type vehicle and a frame manufacturing method according to a second embodiment of the present invention will be described hereinafter with reference to FIG. 9, putting stress on the parts different from the first embodiment. It is noted that parts similar to those of the first embodiment are indicated by the same reference numerals, description of which is omitted.

In the second embodiment, the front cushion pipe 35L is divided into an upper divided pipe 35aL and a lower divided pipe 35bL, and the front cushion pipe 35R is also divided into an upper divided pipe 35aR and a lower divided pipe 35bR, which point is a main difference from the first embodiment.

One end of the upper divided pipes 35aL, 35aR are each connected so as to be an approximately U-shape. In the state that the connected side is arranged on the upper side, the other ends of the pipes 35aL, 35aR are respectively connected to the front ends of the upper pipes 23L, 23R. Further, in the divided pipes 35aL, 35aR, the front cushion bracket 36 along the left/right direction is connected on the upper side.

Further, the left and right front lower pipes 40L, 40R are connected to the lower ends of the lower divided pipes 35bL, 35bR so as to extend rearwardly, and the left and right front sub-pipes 41L, 41R are connected to the intermediate portions of the lower divided pipes 35bL, 35bR so as to extend rearwardly. In addition, the front arm upper bracket 43 along the left/right direction connects the intermediate portions of the lower divided pipes 35bL, 35bR together, and the lower arm front bracket 44 along the left/right direction connects the lower portions of the lower divided pipes 35bL, 35bR together.

In the frame structure of the second embodiment, the upper divided pipes 35aL, 35aR out of the front cushion pipes 35L, 35R constitute a part of the center assembly 73 along with the front cushion bracket 36, the steering holder pipes 37L, 37R and the steering upper bracket 38, and the lower divided pipes 35bL, 35bR constitute a part of the front assembly 72. That is, the portion supporting the front suspension not shown is the front assembly 72, and the portion supporting the steering shaft (steering) not shown that is connected to the handle bar 16 and supports the power unit 15 including the engine 13 is the center assembly 73.

Thereby, in the front assembly 72 of the second embodiment, the front closed loop structure 76 arranged on the front surface of the body frame 22 is constituted by the lower divided pipes 35bL, 35bR, the front arm upper bracket 43 and the lower arm front bracket 44 for connecting the above divided pipes together on the upper and lower sides. The front assembly 72 in this case is also shaped so that the left and right front sub-pipes 41L, 41R and the left and right front lower pipes 40L, 40R connected from the front closed loop structure 76 to the center assembly 73 extend rearwardly. Further, also in the second embodiment, the front arm upper bracket 43 provided on the front assembly 72, the lower arm front bracket 44, the front lower arm bracket 45, and the upper arm rear brackets 55L, 55R constitute the front suspension support portion 90.

The front assembly 72 of the second embodiment is formed by welding the divided pipes 35aL, 35aR to both ends of the front arm upper bracket 43 along the left/right direction to form the front cushion assembly 82, and welding the lower arm assembly 81 and the steering assembly 83 formed similarly to the first embodiment to the front cushion assembly 82.

Further, in the second embodiment, the upper divided pipes 35aL, 35aR are connected each other with the front cushion bracket 36 and the steering holder pipes 37L, 37R connected to these divided pipes 35aL, 35aR, and the steering upper bracket 38 for connecting the steering holder pipes 37L, 37R together constitute the upper steering assembly 80 supporting the upper portion of the steering shaft not shown. The upper steering assembly 80 constitutes a part of the center assembly 73. That is, the divided pipes 35aL, 35aR of the upper steering assembly 80 are connected to the front ends of the upper pipes 23L, 23R, and the steering holder pipes 37L, 37R are connected to the steering cross pipe 28 joining the intermediate portions of the upper pipes 23L, 23R. Also in the upper steering assembly 80, the closed loop structure is formed by the steering holder pipes 37L, 37R, the front cushion bracket 36 and the steering upper bracket 38.

The center assembly 73 in the second embodiment is formed, similarly to the first embodiment, in a manner such that the pair of left and right center closed loop pipe structures 77L, 77R are connected to the center cross pipe 27, the steering cross pipe 28, the cross pipe 29, the step cross plate 31, the front lower cross pipe 30 and the front lower connecting pipe 32, to which the upper steering assembly 80 is connected In the second embodiment, when the front assembly 72, the center small assembly 73 and the rear assembly 74 are finally connected, the divided pipes 35bL, 35bR of the front assembly 72 are welded to the divided pipes 35aL, 35aR of the center assembly 73.

According to the second embodiment mentioned above, the effects similar to the first embodiment can be obtained. Further, the accuracy management of the center assembly 73 can be carried out including the upper steering assembly 80 in order to provide the upper steering assembly 80 on the center assembly 73 having the rigidity enhanced and the shape stabilized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A frame structure in a saddle type vehicle comprising:
    a body frame divided into a front assembly having a closed loop structure, an engine support system assembly having a closed loop structure, and a rear suspension support system assembly having a closed loop structure;
    said front assembly and said rear suspension support system assembly are connected to said engine support system assembly to form said body frame,
    wherein said engine support system assembly includes a pair of left and right engine support system closed loop structures connected by an engine support system cross member, and
    wherein said front assembly has a steering support system closed loop structure in the front, and a connecting member connected to said engine support system assembly extends rearwardly from said steering support system closed loop structure.

2. The frame structure in a saddle type vehicle according to claim 1, wherein a steering support portion is provided on said front assembly.

3. The frame structure in a saddle type vehicle according to claim 1, wherein said rear suspension support system assembly includes a pair of left and right triangular rear suspension support system closed loop structures connected by a rear suspension support system cross member and a shock absorber of a rear suspension is supported on a bracket provided at a corner of said rear suspension support system closed loop structure.

4. The frame structure in a saddle type vehicle according to claim 1, wherein a front suspension support portion is provided on said front assembly.

5. A frame structure in a saddle type vehicle comprising:
    a body frame divided into a front assembly having a closed loop structure, an engine support system assembly having a closed loop structure, and a rear suspension support system assembly having a closed loop structure;
    said front assembly and said rear suspension support system assembly are connected to said engine support system assembly to form said body frame,
    wherein said rear suspension support system assembly includes a pair of left and right triangular rear suspension support system closed loop structures connected by a rear suspension support system cross member and a shock absorber of a rear suspension is supported on a bracket provided at a corner of said rear suspension support system closed loop structure.

6. The frame structure in a saddle type vehicle according to claim 5, wherein said engine support system assembly includes a pair of left and right engine support system closed loop structures connected by an engine support system cross member.

7. The frame structure in a saddle type vehicle according to claim 5, wherein said front assembly has a steering support system closed loop structure in the front, and a connecting member connected to said engine support system assembly extends rearwardly from said steering support system closed loop structure.

8. The frame structure in a saddle type vehicle according to claim 5, wherein when said rear suspension is fully compressed, said shock absorber is positioned at a position in which an angle of said corner is divided approximately into two equal parts.

9. The frame structure in a saddle type vehicle according to claim 5, wherein a front suspension support portion is provided on said front assembly.

10. A method of manufacturing a frame in a saddle type vehicle, the method comprising:
    separately forming a front assembly having a closed loop structure, an engine support system assembly having a closed loop structure, and a rear suspension support system assembly having a closed loop structure; and
    connecting said front assembly and said rear suspension support system assembly to said engine support system assembly to form a body frame,
    wherein said rear suspension support system assembly includes a pair of left and right triangular rear suspension support system closed loop structures connected by a rear suspension support system cross member and a shock absorber of a rear suspension is supported on a bracket provided at a corner of said rear suspension support system closed loop structure.

11. A frame structure in a saddle type vehicle comprising:
    an engine support system assembly having a pair of left and right engine support system closed loop structures connected by an engine support system cross member;
    a front assembly having a steering support system closed loop structure in the front, and a connecting member connected to said engine support system assembly extends rearwardly from said steering support system closed loop structure; and
    a rear suspension support system assembly having a pair of left and right rear suspension support system closed loop structures connected by a rear suspension support system cross member and a shock absorber of a rear suspension is supported on a bracket provided at a corner of said rear suspension support system closed loop structure,
    wherein said front assembly and said rear suspension support system assembly are connected to said engine support system assembly to form a main body frame.

12. The frame structure in a saddle type vehicle according to claim 11, wherein the pair of left and right triangular rear suspension support system closed loop structures form a triangular shape.

13. The frame structure in a saddle type vehicle according to claim 11, wherein a steering support portion is provided on said front assembly.

14. The frame structure in a saddle type vehicle according to claim 11, wherein a steering support portion is provided on said engine support system assembly.

15. The frame structure in a saddle type vehicle according to claim 11, wherein when said rear suspension is fully compressed, said shock absorber is positioned at a position in which an angle of said corner is divided approximately into two equal parts.

16. A frame structure in a saddle type vehicle comprising:
    a body frame divided into a front assembly having a closed loop structure, an engine support system assembly having a closed loop structure, and a rear suspension support system assembly having a closed loop structure; and said front assembly and said rear suspension support system assembly are connected to said engine support system assembly to form said body frame, wherein said engine support system assembly includes a pair of left and right engine support system closed loop structures connected by an engine support system cross member, and wherein said front assembly has a steering support system closed loop structure in the front, and a connecting member connected to said engine support system assembly extends rearwardly from said steering support system closed loop structure.

17. The frame structure in a saddle type vehicle according to claim 16, wherein said rear suspension support system assembly includes a pair of left and right triangular rear suspension support system closed loop structures connected by a rear suspension support system cross member and a shock absorber of a rear suspension is supported on a bracket provided at a corner of said rear suspension support system closed loop structure.

18. The frame structure in a saddle type vehicle according to claim 17, wherein when said rear suspension is fully compressed, said shock absorber is positioned at a position in which an angle of said corner is divided approximately into two equal parts.

19. The frame structure in a saddle type vehicle according to claim 16, wherein a front suspension support portion is provided on said front assembly.

\* \* \* \* \*